US008825685B2

(12) United States Patent
Menze et al.

(10) Patent No.: US 8,825,685 B2
(45) Date of Patent: Sep. 2, 2014

(54) SELECTIVE FILE SYSTEM CACHING BASED UPON A CONFIGURABLE CACHE MAP

(75) Inventors: Edwin Menze, Portland, OR (US); Raghupathi Malige, San Jose, CA (US); Bala Kumaresan, East Palo Alto, CA (US); Tillmann Reusse, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 306 days.

(21) Appl. No.: 12/619,417

(22) Filed: Nov. 16, 2009

(65) Prior Publication Data

US 2011/0119228 A1     May 19, 2011

(51) Int. Cl.
*G06F 17/30* (2006.01)
*G06F 7/00* (2006.01)

(52) U.S. Cl.
USPC ............ 707/758; 707/694; 707/812; 707/822

(58) Field of Classification Search
None
See application file for complete search history.

(56) References Cited

U.S. PATENT DOCUMENTS

| | | | | |
|---|---|---|---|---|
| 4,399,503 A * | 8/1983 | Hawley | | 711/113 |
| 4,408,273 A | 10/1983 | Plow | | |
| 5,097,533 A | 3/1992 | Burger et al. | | |
| 5,301,295 A * | 4/1994 | Leary et al. | | 711/125 |
| 5,337,412 A | 8/1994 | Baker et al. | | |
| 5,790,828 A * | 8/1998 | Jost | | 711/4 |
| 5,854,942 A * | 12/1998 | Penokie | | 710/10 |
| 5,937,426 A * | 8/1999 | Sokolov | | 711/113 |
| 6,012,104 A | 1/2000 | Van Nguyen et al. | | |
| 6,044,415 A | 3/2000 | Futral et al. | | |
| 6,098,149 A | 8/2000 | Ofer et al. | | |
| 6,219,693 B1 | 4/2001 | Napolitano et al. | | |
| 6,301,605 B1 * | 10/2001 | Napolitano et al. | | 709/201 |
| 6,301,640 B2 | 10/2001 | Barve et al. | | |
| 6,349,363 B2 * | 2/2002 | Cai et al. | | 711/129 |
| 6,421,761 B1 * | 7/2002 | Arimilli et al. | | 711/128 |

(Continued)

FOREIGN PATENT DOCUMENTS

| | | |
|---|---|---|
| JP | 11345164 A2 | 12/1999 |
| JP | 2004-287476 A | 10/2004 |
| WO | 2009062063 A1 | 5/2009 |

OTHER PUBLICATIONS

Anonymous: "Oracle9iAS Discoverer Configuration Guide—Version 9.0.2—Part No. A95458-02" [Online] May 1, 2002, pp. I-index-6, XP002624483 ORACLE; Retrieved from the Internet: URL: http://download.oracle.com/docs/cd/A97329_03/bi.902/a95458.pdf> [retrieved on Feb. 23, 2011] sentences 9-1-sentences 9-20; figures 9-3.

(Continued)

*Primary Examiner* — Kaveh Abrishamkar
*Assistant Examiner* — James J Wilcox
(74) *Attorney, Agent, or Firm* — Wilmer Cutler Pickering Hale and Dorr LLP

(57) ABSTRACT

A method for implementing selective file system caching. The method includes receiving I/O requests from an application and comparing each of the I/O requests with a configurable cache map, wherein the configurable cache map controls a selective caching based on an I/O type and a file type. Each of the I/O requests are processed to render caching decisions based on the configurable cache map. Selective caching is then implemented on each of the I/O requests in accordance with the caching decisions.

19 Claims, 11 Drawing Sheets

(56) References Cited

U.S. PATENT DOCUMENTS

| | | | |
|---|---|---|---|
| 6,453,321 B1* | 9/2002 | Hill et al. | 1/1 |
| 6,463,509 B1* | 10/2002 | Teoman et al. | 711/137 |
| 6,502,205 B1 | 12/2002 | Yanai et al. | |
| 6,671,767 B2 | 12/2003 | Furuumi et al. | |
| 6,687,765 B2* | 2/2004 | Surugucchi et al. | 710/15 |
| 6,721,814 B1* | 4/2004 | Litvin et al. | 710/6 |
| 6,754,734 B2 | 6/2004 | Goode et al. | |
| 6,981,112 B2* | 12/2005 | Christofferson et al. | 711/156 |
| 7,010,645 B2* | 3/2006 | Hetzler et al. | 711/113 |
| 7,113,937 B2 | 9/2006 | Goode et al. | |
| 7,228,388 B2* | 6/2007 | Hu et al. | 711/138 |
| 7,383,392 B2* | 6/2008 | Mark et al. | 711/137 |
| 7,640,395 B2* | 12/2009 | Coulson et al. | 711/113 |
| 7,730,265 B1* | 6/2010 | Cypher et al. | 711/141 |
| 7,756,909 B2* | 7/2010 | Volodarsky et al. | 707/812 |
| 7,831,642 B1* | 11/2010 | Kumaresan et al. | 707/822 |
| 7,836,261 B2* | 11/2010 | Keohane et al. | 711/139 |
| 7,856,530 B1* | 12/2010 | Mu | 711/119 |
| 7,996,623 B2* | 8/2011 | Walker | 711/137 |
| 8,001,538 B2* | 8/2011 | Gray et al. | 717/141 |
| 8,255,627 B2* | 8/2012 | Blinick et al. | 711/118 |
| 2003/0182390 A1* | 9/2003 | Alam | 709/216 |
| 2004/0039886 A1* | 2/2004 | Christofferson et al. | 711/156 |
| 2005/0246501 A1* | 11/2005 | Batra et al. | 711/138 |
| 2005/0256976 A1* | 11/2005 | Susairaj et al. | 710/3 |
| 2006/0271740 A1 | 11/2006 | Mark et al. | |
| 2008/0040538 A1* | 2/2008 | Matsuzawa et al. | 711/113 |
| 2008/0098169 A1 | 4/2008 | Kaluskar et al. | |
| 2008/0184003 A1 | 7/2008 | Ono | |

OTHER PUBLICATIONS

Fineberg, A. A., et al.: "Performance Measurements of a User-Space DAFS Server with a Database Workload" Proceedings OT the ACM SIGCOM 2003 Workshops, Aug. 25, 2003, pp. 185-195, XP040168252 New York, USA, DOI: 10.1145/944747.944751 p. 185, right-hand column, line 10—p. 188, right-hand column, line 13.

EPO Communication issued in corresponding European Application No. 10784611.5, dated Dec. 11, 2013, 6 pages.

Macdougal, R. "Introduction to File Systems for Solaris Users" SunWorld 9(9):79-88, 1999.

Office Action mailed on Jun. 17, 2014 for co-pending JP Application No. 2012-238911; 3 pages.

* cited by examiner

400

Configurable Cache Map

|  | File type 1 | File type 2 | File type 3 | File type 4 |
|---|---|---|---|---|
| I/O type 1 | No cache | Cache + Read ahead | Cache | No cache |
| I/O type 2 | Cache + Read ahead | No cache | No cache | Cache |
| I/O type 3 | No cache | Cache | Cache + Read ahead | No cache |
| I/O type 4 | Cache | Cache + Read ahead | No cache | Cache + Read ahead |

FIG. 4

SELECTIVE FILE SYSTEM CACHING BASED UPON A CONFIGURABLE CACHE MAP

FIELD OF THE INVENTION

The present invention is generally related to digital computer systems.

BACKGROUND OF THE INVENTION

Information drives business. Companies today rely to an unprecedented extent on online, frequently accessed, constantly changing data to run their businesses. Online transaction processing (OLTP) systems are an important part of running businesses.

Typical OLTP systems involve processing simple to moderately complex transactions with multiple updates occurring to a database. The performance of the database in an OLTP environment is heavily dependent upon I/O speed and memory configurations of the database application and the file system supporting the database application. There is extensive ongoing development to improve I/O performance and memory subsystem performance.

The Oracle Disk Manager™ (ODM) is an alternative I/O interface which can be used by a database application. It provides improvements over the standard POSIX I/O interface by allowing multiple I/O requests per system call, reducing overhead in managing file descriptors, and improving file management semantics.

However, there are potential performance problems with ODM. For example, ODM provides a direct I/O interface, bypassing a file system cache scheme. Such a direct I/O interface has advantages in that it streamlines certain I/O requests (e.g., by circumventing file locking mechanisms and schemes). However, the prevention of caching by the host file system has performance drawbacks with other types of I/O requests. In this manner, the conventional ODM interface can force an unattractive either/or proposition on database administrators.

SUMMARY OF THE INVENTION

Embodiments of the present invention can provide a direct-I/O capability which bypasses a file system cache structure. Embodiments of the present invention implement a conditional caching capability, where certain I/O requests made by an application will in fact use the file system cache structure. The selective cache or no-cache decision is based on configuration settings and metadata received from the application that provides an indication as to how the I/O requests will be used by the application.

In one embodiment, the present invention comprises a computer-based method for implementing selective file system caching. The method includes receiving I/O requests from an application and comparing each of the I/O requests with a configurable cache map, wherein the configurable cache map controls a selective caching based on an I/O type and a file type. Each of the I/O requests is processed to render caching decisions based on the configurable cache map. Selective caching is then implemented on each of the I/O requests in accordance with the caching decisions.

In one embodiment, the I/O type and the file type are received as metadata associated with the I/O requests.

In one embodiment, the application implements application directed caching of application I/O requests into an application cache separate from a file system cache.

In one embodiment, the application provides a no-cache indication to the file system to implement a direct I/O, causing the file system to not cache the direct I/O.

In one embodiment, the application is a database application.

In one embodiment, the application interfaces with the file system via an ODM compliant interface module.

In one embodiment, the configurable cache map is user defined via a command line interface of the file system.

In one embodiment, the configurable cache map is user defined via a GUI interface of the file system.

In one embodiment, at least one caching decision causes the file system to implement read ahead caching into a file system cache.

In one embodiment, the read ahead caching is implemented in accordance with the caching decisions and the configurable cache map.

In another embodiment, the present invention is implemented as a computer readable storage medium having stored thereon, computer executable instructions that, if executed by a computer system cause the computer system to perform a method. The method includes receiving I/O requests from a database application and comparing each of the I/O requests with a configurable cache map, wherein the configurable cache map controls a selective caching based on an I/O type and a file type. The I/O type and the file type comprise metadata associated with the I/O requests. The method further includes processing each of the I/O requests to render caching decisions based on the configurable cache map, and executing selective caching on each of the I/O requests in accordance with the caching decisions.

In another embodiment, the present invention is implemented as database computer system. The database computer system includes a processor coupled to a computer readable storage media and executing computer readable code which causes the computer system to receive I/O requests from a database application and compare each of the I/O requests with a configurable cache map. The configurable cache map controls selective caching based on an I/O type and a file type. The I/O type and the file type comprise metadata associated with the I/O requests. The computer system processes each of the I/O requests to render caching decisions based on the configurable cache map. The computer system then executes selective caching on each of the I/O requests in accordance with the caching decisions.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

FIG. 4 shows a configurable cache map in accordance with one embodiment of the present invention.

DETAILED DESCRIPTION OF THE INVENTION

Figure 1:
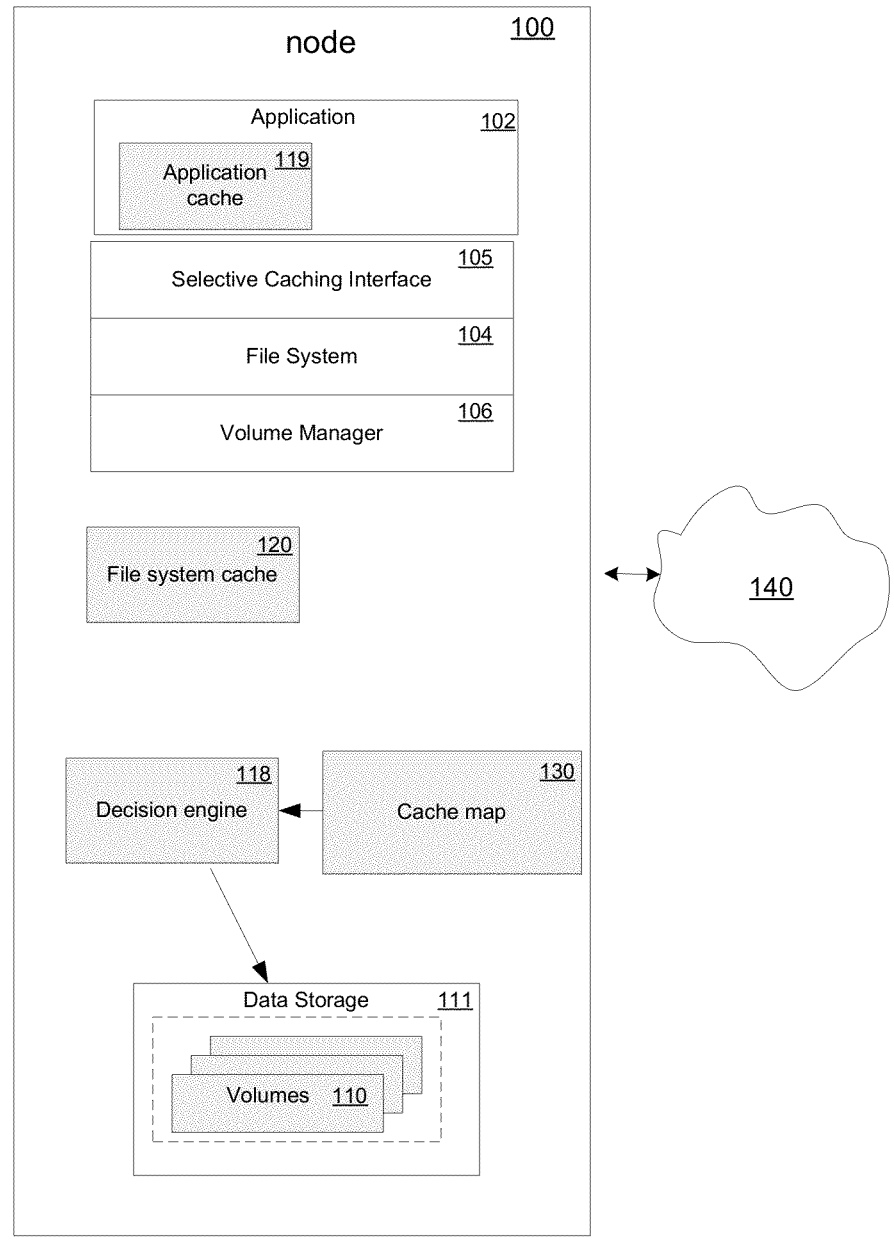
FIG. 1 shows a diagram of an exemplary computing node in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "relocating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention can advantageously provide a direct-I/O capability that bypasses a file system cache scheme or cache structure. Embodiments of the present invention implement a conditional caching capability, where certain I/O requests made by an application (e.g., a database application) will in fact use the file system cache structure. In one embodiment, the selective cache or no-cache decision is based on configuration settings and metadata received from the application. This metadata provides a "hint" or an indication as to how the application is to process the data comprising I/O requests. An exemplary file system computing node as depicted in FIG. 1 is now described.

FIG. 1 shows a diagram of an exemplary computing node 100 in accordance with one embodiment of the present invention. The FIG. 1 embodiment shows an example of a computer system accessing a multi-volume volume set (e.g., volume set 110). A volume manager 106 is typically configured to operate upon the volumes comprising multi-volume set 110. The volume manager operates in conjunction with the file system 104 to provide data storage and data I/O services to one or more applications 102 executing on the node 100. In the FIG. 1 embodiment, the application 102 includes its own application cache data structure 119 and is configured to support its own caching schemes and techniques. The file system maintains its own file system cache 120. The computing node 100 is coupled to other external computers and other networks via a computer network 140 (e.g., LAN, WAN, Internet, etc.).

FIG. 1 also shows a selective caching interface 105, a decision engine 118, a configurable cache map 130, and a file system cache 120.

The selective caching interface 106 functions by receiving I/O requests from the application and comparing each of the I/O requests with the configurable cache map, wherein the configurable cache map controls a selective caching based on an I/O type and a file type. The decision engine 118 functions by processing each of the I/O requests to render caching decisions based on the configurable cache map. Selective caching is then implemented on each of the I/O requests in accordance with the caching decisions.

Figure 2:
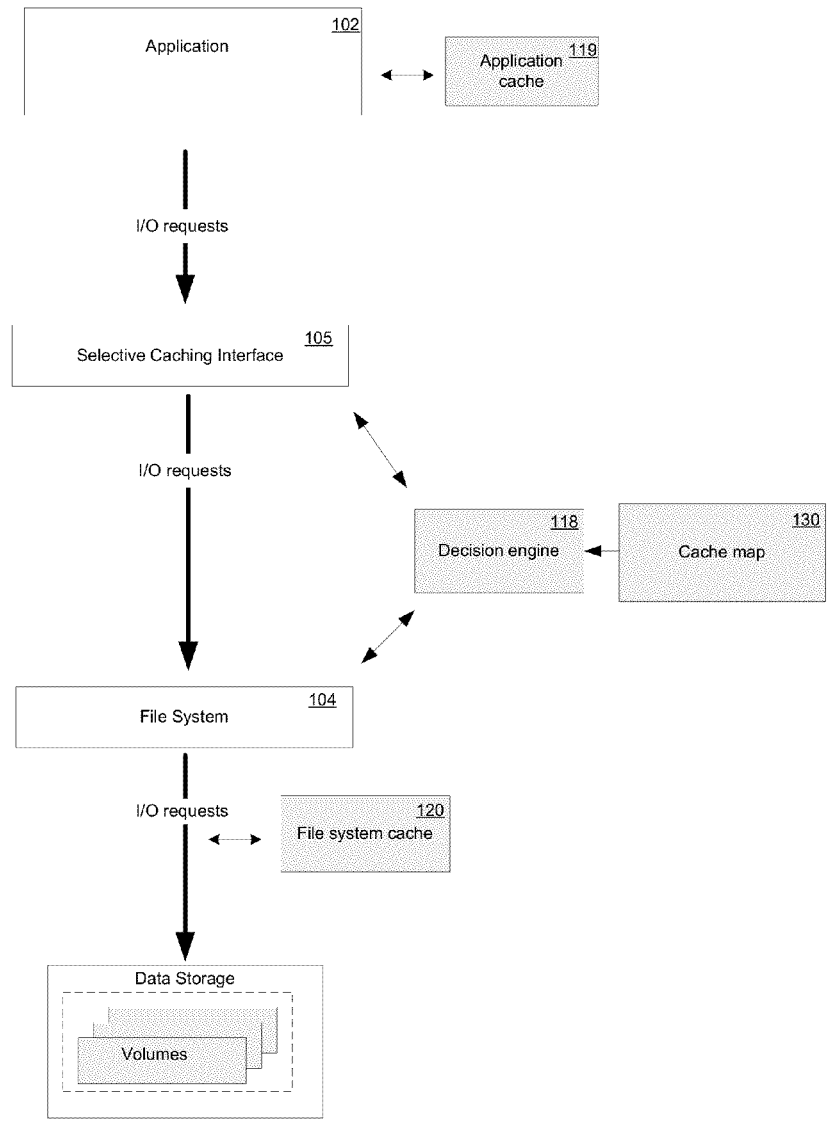
FIG. 2 shows a flow diagram that illustrates the flow of information and data as a selective caching functionality in accordance one embodiment of the present invention is implemented.

FIG. 2 shows a flow diagram that illustrates the flow of information and data as a selective caching functionality in accordance one embodiment of the present invention is implemented. As depicted in FIG. 2, data flow relationships are illustrated as pertaining to the application 102, the selective caching interface 105, the decision engine 118 and cache map 130, and the file system 104 and file system cache 120.

As described above, embodiments of the present invention can provide a direct-I/O capability which bypasses a file system cache structure (e.g., file system cache 120). Embodiments of the present invention implement a conditional caching capability, where certain I/O requests made by an application will in fact use the file system cache structure. The selective cache or no-cache decision is based on configuration settings and metadata received from the application that provides an indication as to how to process the I/O requests. In this manner, the application provides "hints" to the file system indicating how it intends to use the data resulting from the I/O request.

FIG. 2 shows the selective caching interface 105 receiving I/O requests from application 102. The I/O requests include metadata that describe the I/O type and the file type of each particular I/O request. As the I/O request is passed to the file system 104, the decision engine 118 compares each of the I/O requests with a configurable cache map 130.

The configurable cache map is a user configurable (e.g., system administrator, etc.) component that controls the selective caching based on the I/O type and the file type as received from the application 102. Each of the I/O requests is processed by the decision engine 118 to render caching decisions based on the configurable cache map 130.

The file system 104 then processes the I/O requests with the volumes of data storage 111. The file system implements selective caching on each of the I/O requests in accordance with the caching decisions. For example, in accordance with a cache or no-cache decision, data comprising a particular I/O request is cached within the file system cache 120 or not.

In one embodiment, the selective caching interface 105 comprises an ODM compliant interface module. In other words, the selective caching interface appears to the application as an Oracle Disk Manager (ODM). ODM is an I/O interface which can be used by a database application (e.g., Oracle 10™, etc.). This is particularly helpful in those scenarios where the application 102 is a database application.

Embodiments of the present invention solve problems that occur with a conventional ODM. As described above, the selective caching interface 105 can provide the application with a direct the I/O interface, bypassing a file system cache scheme. Such a direct I/O interface has advantages in that it streamlines certain requests (e.g., by circumventing file locking mechanisms and schemes). The selective caching interface 105 also has a file system caching capability which allows caching I/O requests to specific files by using the file system, while retaining some of other performance benefits (avoiding I/O locking, for example).

In one embodiment, the selective caching is specifically configured to avoid double caching problems. This occurs in those situations where the application has its own caching scheme and caching specification and the application executes its own caching system using the application cache 119. This I/O information should not be duplicated within the file system cache 120. For example, in an embodiment where the application is a database application, reads which will be cached by the database application itself in the application cache should not be cached by the file system cache. This is particularly useful, since many database applications utilize direct I/O interfaces like ODM and QIO to explicitly avoid such double caching. On the other hand, file system caching as used for sequential reads to populate per-process memory are better candidates for caching within the file system itself, since other processes besides the application 102 may benefit from such caching.

In one embodiment, read ahead caching is specifically implemented by the file system for certain I/O types and file types. As described above, in those situations where a number of processes and/or applications are executing within the node 100, file system caching provides performance benefits to each of the processes. In such an embodiment, sequential read ahead caching can be specifically implemented by the file system using the file system cache.

It should be noted that the selective caching functionality can also be extended to files on Cluster File Systems. Caches are appropriately invalidated throughout the cluster when files are written.

Figure 3:
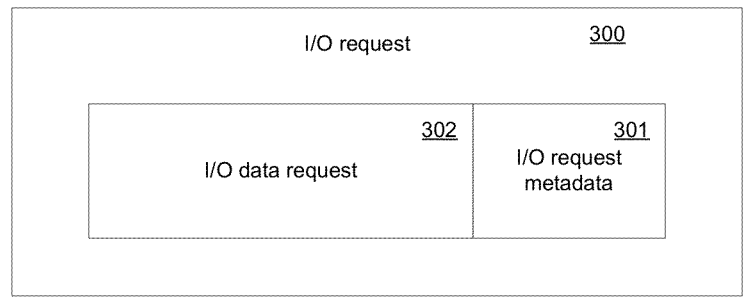
FIG. 3 shows an I/O request as received from an application in accordance with one embodiment of the present invention.

FIG. 3 shows an I/O request as received from an application in accordance with one embodiment of the present invention. As depicted in FIG. 3, the I/O request 300 includes I/O request metadata 301 and the I/O data requested 302. The I/O data request 302 is what is operated on by the file system to read or write data to or from the volumes 110. As described above, the selective cache or no-cache decision is based on metadata received from the application that provides an indication as to how the application will process the I/O request. The application provides "hints" to the file system indicating how it intends to use the data resulting from the I/O request. The I/O requests include metadata 301 that describe the I/O type and the file type of each particular I/O request.

FIG. 4 shows a configurable cache map 400 in accordance with one embodiment of the present invention. As described above, the selective cache or no-cache decision is based on configuration settings and metadata received from the application that provide an indication as to how to process the I/O requests. These configuration settings are provided by the configurable cache map.

As described above, the configurable cache map is a user configurable (e.g., system administrator, etc.) component that controls the selective caching based on the I/O type and the file type as received from the application 102. Each of the I/O requests is processed by the decision engine 118 to render caching decisions based on the configurable cache map 130.

The map is user configurable in that for each file type and for each I/O type (e.g., in one embodiment, file type and I/O type pairs), the file system can be instructed whether the I/O request is to be cached or not. Caching would be disabled for type pairs which suggest that the application is caching the data itself in shared memory available to all database processes. In addition to caching, the file system can be instructed to conditionally perform read ahead caching for specific file type and I/O type pairs. The file system can be instructed to always cache or perform read ahead for certain file types and certain I/O types.

Figure 5:
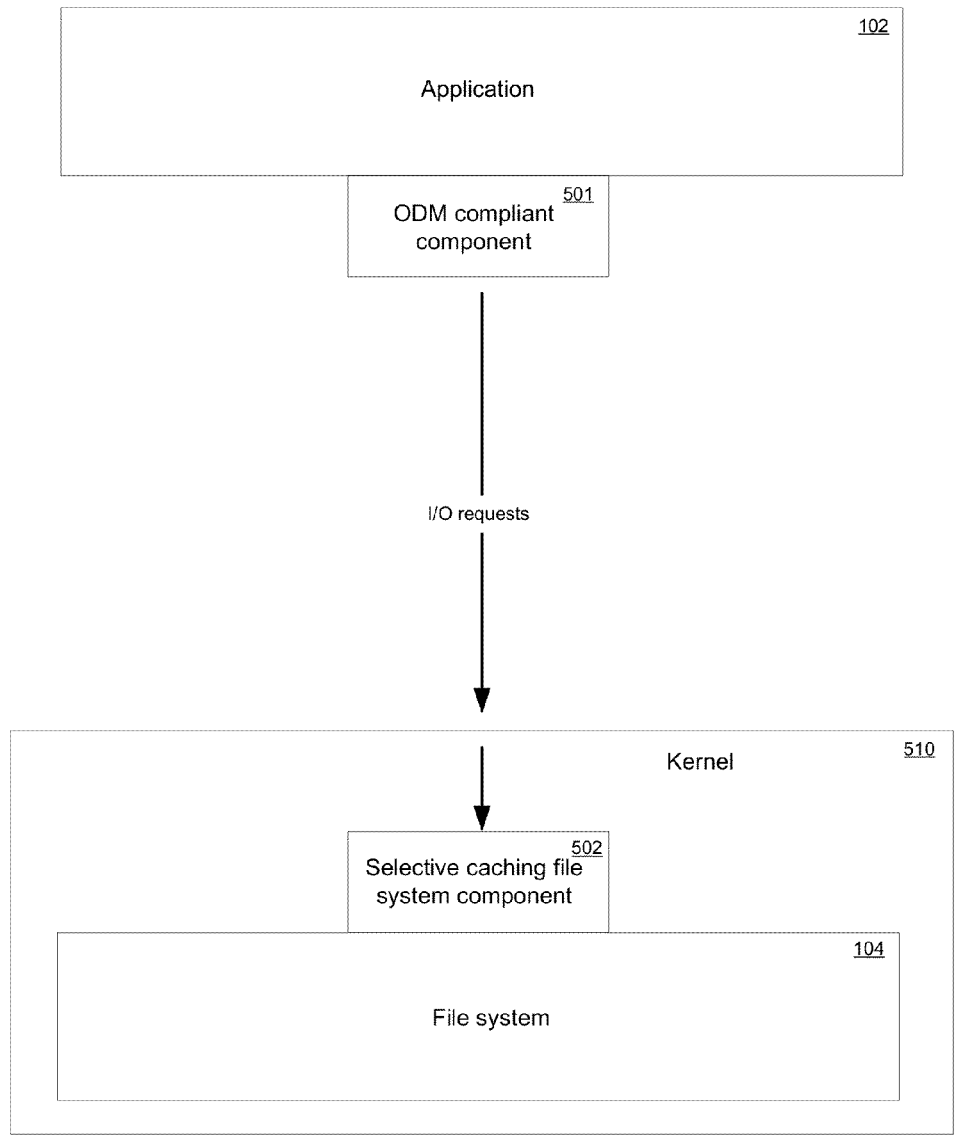
FIG. 5 shows a diagram depicting a relationship between an ODM compliant component and the file system and a file system kernel in accordance with one embodiment of the present invention.

FIG. 5 shows a diagram depicting a relationship between an ODM compliant component 501 and the file system 104 and a file system kernel 510 in accordance with one embodiment of the present invention. As shown in FIG. 5, the selective caching interface is implemented as an ODM compliant component 501. As described above, in one embodiment, the selective caching interface 105 comprises an ODM compliant interface module. The ODM compliant component 501 appears to the application as an Oracle Disk Manager (ODM). ODM is an I/O interface which can be used by a database application (e.g., Oracle 10™, etc.).

In the FIG. 5 embodiment, the ODM compliant component 501 is within application memory space, outside of the protected kernel 510. There is a selective caching file system component 502 that interfaces with the file system 104 that is within kernel space. Thus there is one context switch between user mode and kernel mode as I/O requests come in from the application 102.

Figure 6:
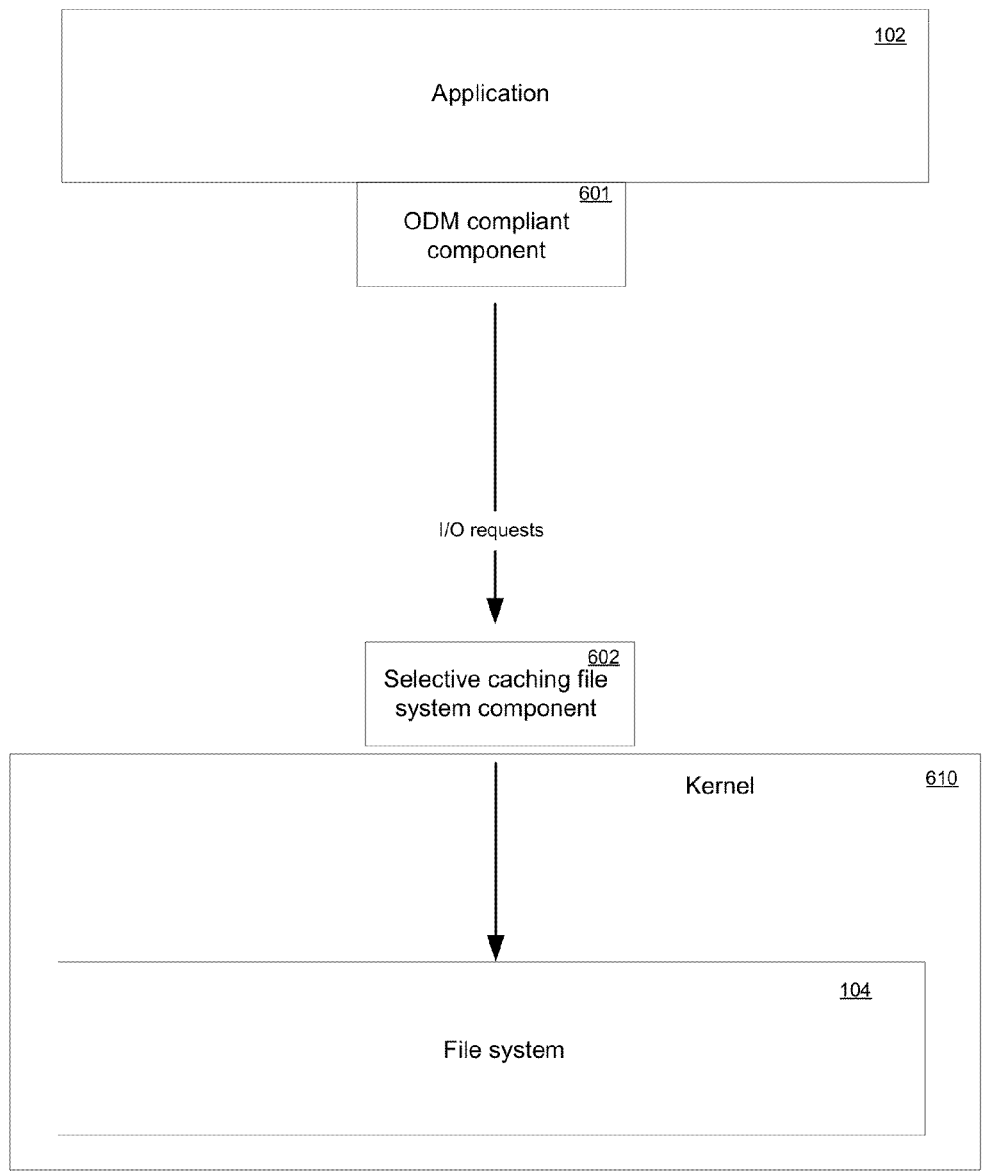
FIG. 6 shows a diagram depicting a user mode relationship between an ODM compliant component and the file system and a file system kernel in accordance with one embodiment of the present invention.

FIG. 6 shows a diagram depicting a user mode relationship between an ODM compliant component 601 and the file system 104 and a file system kernel 610 in accordance with another embodiment of the present invention. As shown in FIG. 6, both the ODM compliant component 601 and the selective caching file system component 602 are implemented as a user mode components. In this configuration, the code comprising the file system kernel can be kept in a comparatively stable state. File system kernel code tends to be extensively debugged and extensively tested. This provides great incentives to maintain kernel code stability.

In the FIG. 6 embodiment, the ODM compliant component 501 is within application memory space, outside of the protected kernel 510. There is a selective caching file system component 502 that interfaces with the file system 104 that is also outside of the protected kernel 510. Thus, as with the FIG. 5 embodiment, there is one context switch between user mode and kernel mode as I/O requests come in from the application 102.

Figure 7:
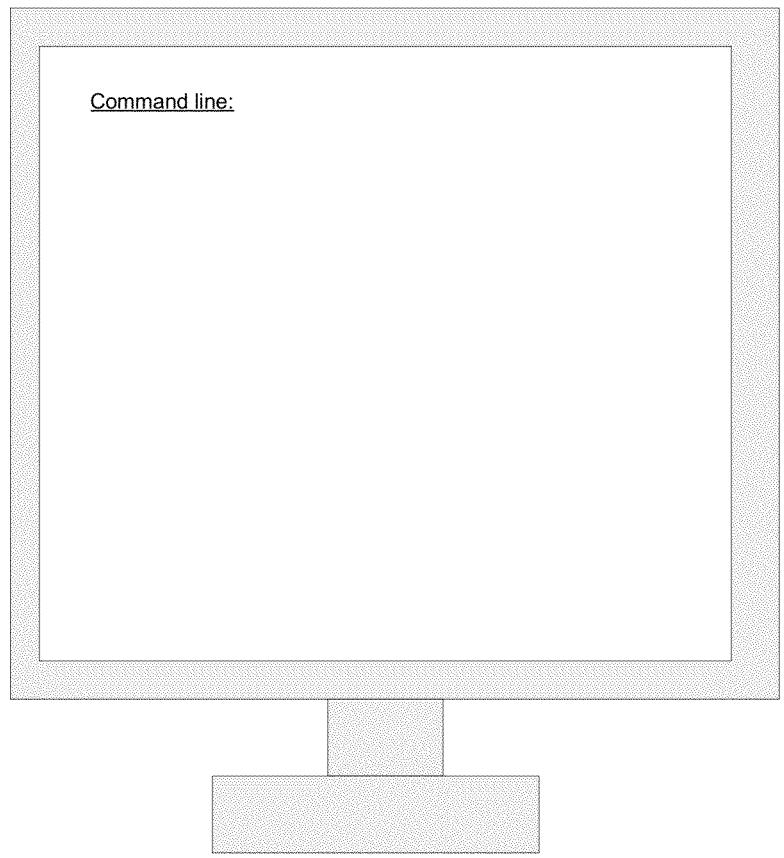
FIG. 7 shows a monitor displaying a command line interface for configuring a configurable cache map in accordance with one embodiment of the present invention.

FIG. 7 shows a monitor 700 displaying a command line interface for configuring a configurable cache map in accordance with one embodiment of the present invention. As described above, the configurable cache map is a user configurable (e.g., system administrator, etc.) component that controls the selective caching based on the I/O type and the file type as received from the application 102. The map is user configurable in that for each file type and for each I/O type, the file system can be instructed as to how to handle the I/O request. In the FIG. 7 embodiment, this configuration is implemented via a command line interface.

Figure 8:
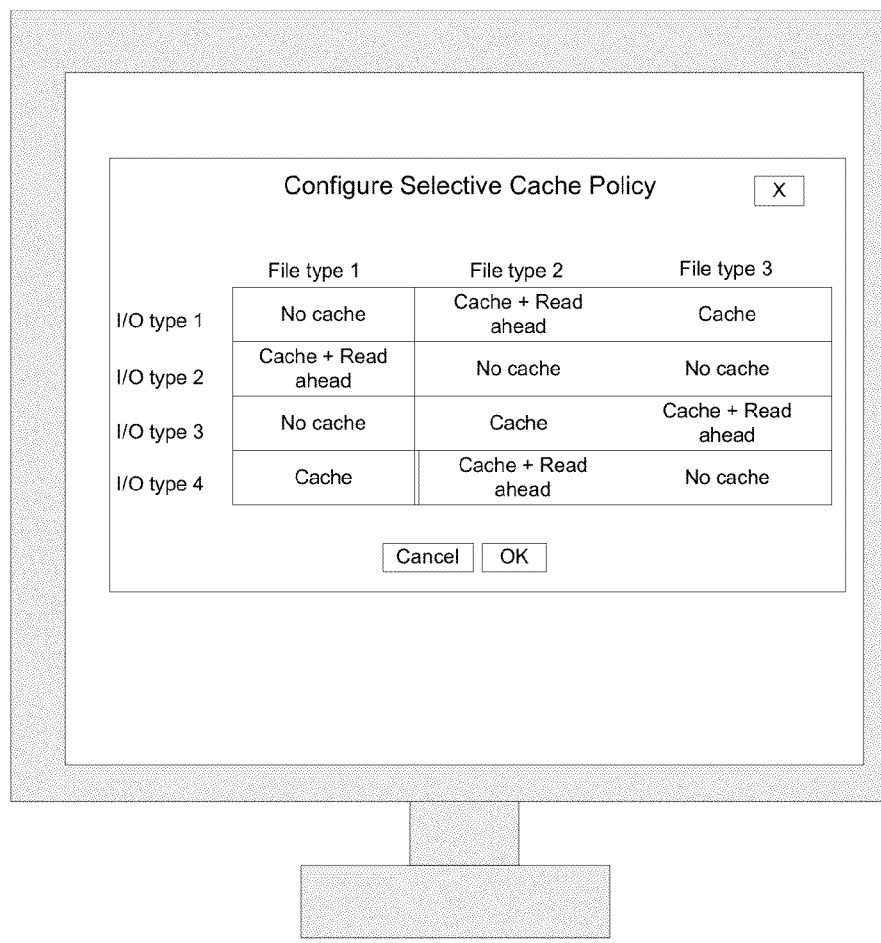
FIG. 8 shows a monitor displaying a GUI (graphical user interface) for configuring a configurable cache map in accordance with one embodiment of the present invention.

FIG. 8 shows a monitor 800 displaying a GUI (graphical user interface) for configuring a configurable cache map in accordance with one embodiment of the present invention. The functionality of the configurable cache map is substantially the same as that described in the FIG. 7 embodiment. However, the FIG. 8 embodiment shows GUI elements with which a user (e.g., server administrator) can interact and configure the map.

Figure 9:
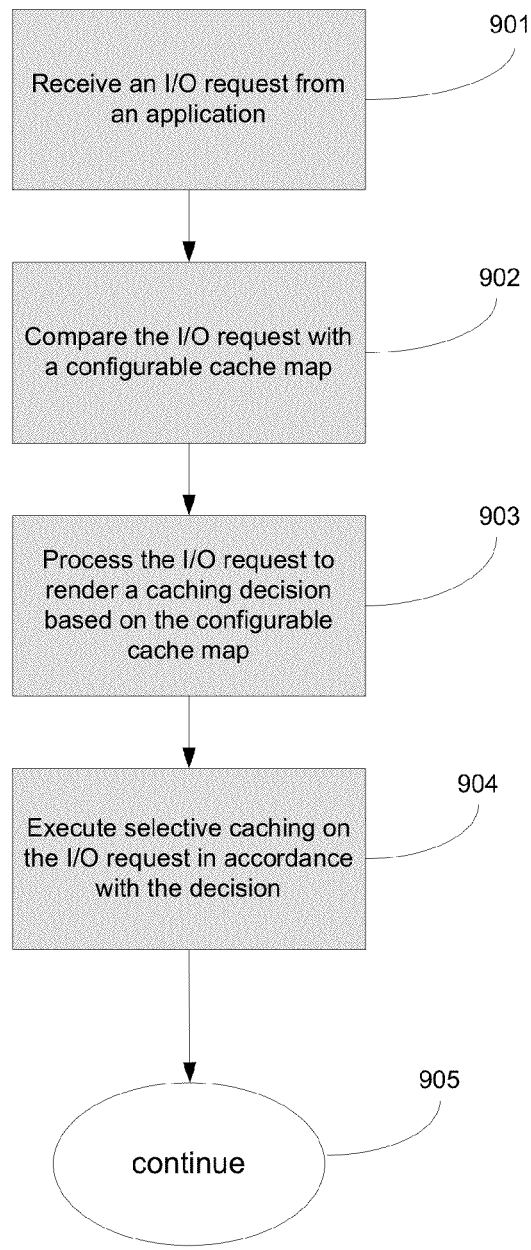
FIG. 9 shows a flow chart of the steps of a selective caching process in accordance with one embodiment of the present invention.

FIG. 9 shows a flow chart of the steps of a selective caching process 900 in accordance with one embodiment of the present invention. As depicted in FIG. 9, process 900 shows exemplary operating steps of a selective caching process during the processing of I/O requests from an application.

Process 900 begins in step 901, where a selective caching interface receives an I/O request from an application. In step 902, the decision engine compares the I/O request with a configurable cache map. As described above, the configurable cache map controls selective caching based on an I/O type and a file type. In step 903, the I/O request is processed by the decision engine to render a caching decision. As described above, this decision is based on the configurable cache map. Subsequently, in step 904, selective caching is implemented by the file system on the I/O request in accordance with the caching decision. As indicated by step 905, the selective caching process continues as new I/O requests are received from the application.

Figure 10:
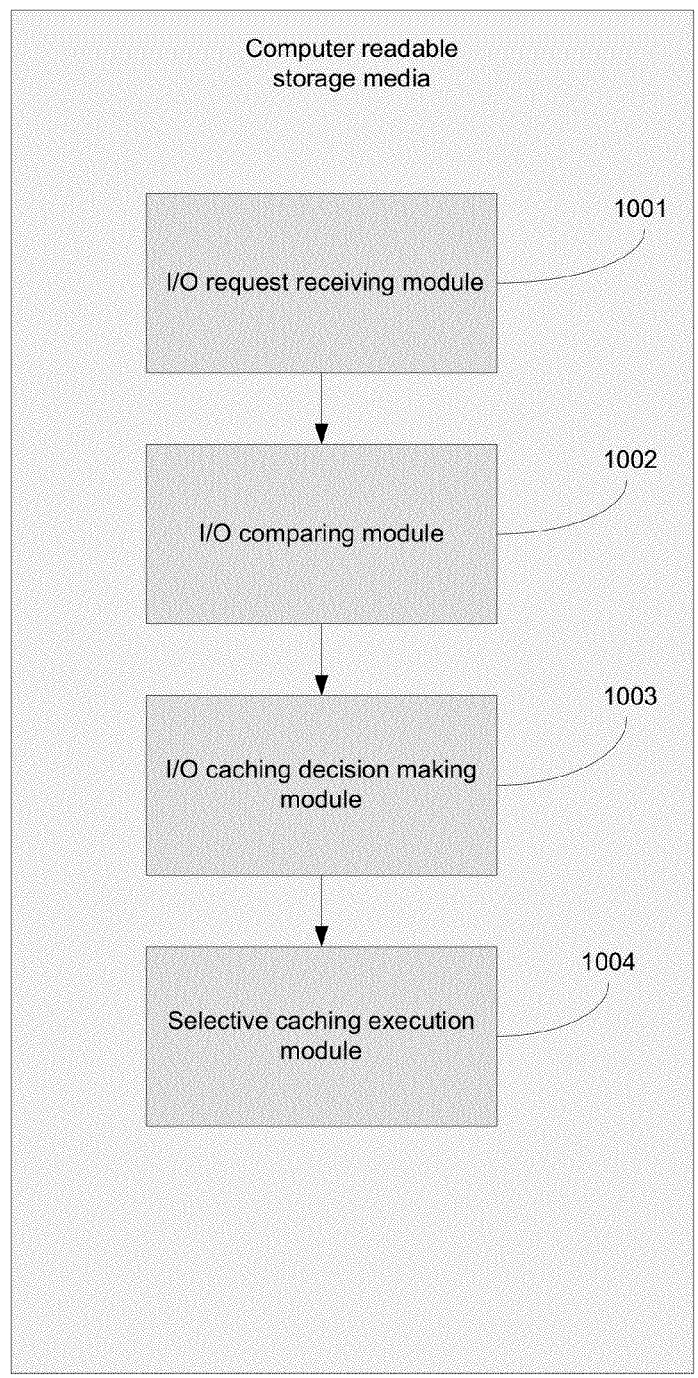
FIG. 10 shows a computer readable storage media storing software-based instantiations of modules in accordance with one embodiment of the present invention.

FIG. 10 shows a computer readable storage media storing software-based instantiations of modules 1001-1004 in accordance with one embodiment of the present invention. As depicted in FIG. 10, the modules 1001-1004 function by implementing a process (e.g., process 900 of FIG. 9) for selectively caching I/O requests from an application.

The I/O request receiving module 901 functions by receiving I/O requests from applications executing on the computer system (e.g., database application). The I/O comparing module 902 functions by comparing the I/O request with a configurable cache map. As described above, the configurable cache map controls a selective caching based on an I/O type and a file type. The I/O caching decision making module 903 functions by processing the I/O request to render a caching decision. As described above, this decision is based on the configurable cache map. The selective caching execution module functions by implementing the selective caching via the file system.

It should be noted that in one embodiment, where the application is a database application, the database application can receive the advantage of direct I/O, thereby bypassing the file system page cache and performing asynchronous I/O. This helps to boost the performance of write intensive OLTP (online transaction processing) workloads. Data warehouse applications are read intensive and can suffer with conventional ODM because of lack of file system page caching. With embodiments of the present invention however, advantages of both file system page caching and database application asynchronous direct I/O are provided.

In one embodiment, the selective caching functionality has read-ahead intelligence and write-through cache intelligence built in. In one embodiment, to optimize the selective I/O caching, a work-load is run and statistics are measured, where caching is selectively turn off on a per file basis depending on the hit ratio. This is performed in order to gather statistics. These statistics enable the system to carefully tune the selective I/O caching algorithms. This process also maintains optimal performance of the selective I/O caching as the workload changes over time.

In one specific embodiment configured to function with Oracle 10g™ database application, the database passes I/O hints, and as described above, the hints indicate what type of I/O operations the database will be performing. Several exemplary hints are now described.

With Oracle 10g™, every ODM I/O request has a hint in odm_ioc structure. Types are transiently associated with files by the application during file creation and file identification. The following exemplary file types have been defined.

| | | |
|---|---|---|
| typedef sword odm_ft; | | /* Oracle ™, file type */ |
| #define ODM_FT_CTL | 1 | /* control file */ |
| #define ODM_FT_DATA | 2 | /* datafile */ |
| #define ODM_FT_OLG | 3 | /* online log file */ |
| #define ODM_FT_ALG | 4 | /* archive log file */ |
| #define ODM_FT_TRC | 5 | /* trace file */ |
| #define ODM_FT_TSORT | 6 | /* temp sort file */ |
| #define ODM_FT_DBKUP | 9 | /* datafile backup piece */ |
| #define ODM_FT_DIBKUP | 10 | /* datafile incremental backup piece */ |
| #define ODM_FT_ABKUP | 11 | /* archivelog backup piece */ |
| #define ODM_FT_DCOPY | 12 | /* datafile copy */ |
| #define ODM_FT_INIT | 13 | /* persistent initialization parameters */ |
| #define ODM_FT_DRC | 14 | /* disaster recovery configuration */ |

Some of the hints which might be inferred from the file type: "I/O to FT_OLG and FT_ALG are always sequential, and never resize" and "I/O to FT_TRC, FT_INIT are not critical". I/O hints are associated with each I/O request passed through the ODM interface. Some of the I/O hints which can make use of dynamic caching are:

```
#define ODM_REDOLOG_WRITE        1  /* redo log write */
#define ODM_REDOLOG_READ         2  /* redo log read for recovery */
#define ODM_ARCHLOG_READ         3  /* archive log read for recovery */
#define ODM_MIRROR_READ          5  /* reread of a block on error */
#define ODM_DATA_CACHE_LOAD     13  /* buffer cache reads */
#define ODM_READ_DATA_HEADER    14  /* data header read */
#define ODM_DATA_READ_SEQ       16  /* data file reads to private memory*/
#define ODM_REDOLOG_AREAD       32  /* redo log read for archiving */
#define ODM_DATAPUMP            36  /* data pump I/O */
```

It should be noted that for performance reasons, the selective caching algorithm needs to have a good algorithm for turning off read-ahead caching. When a database is running for a long time, there is a good chance that the selective caching algorithm will get hints and turn on read-ahead caching on most of the files comprising the database. Without a good algorithm for disabling read-ahead caching, the performance will gradually suffer because of the extra read-ahead caching and paging.

In one embodiment, read ahead caching is turned off when the system has reached a low memory state (e.g., free memory <20% of total). In one embodiment, read ahead caching is turned off when files receive excessive writes, because writes result in numerous cache invalidations. In one embodiment, read ahead caching is turned off after more than certain percentages of data files are cached.

Figure 11:
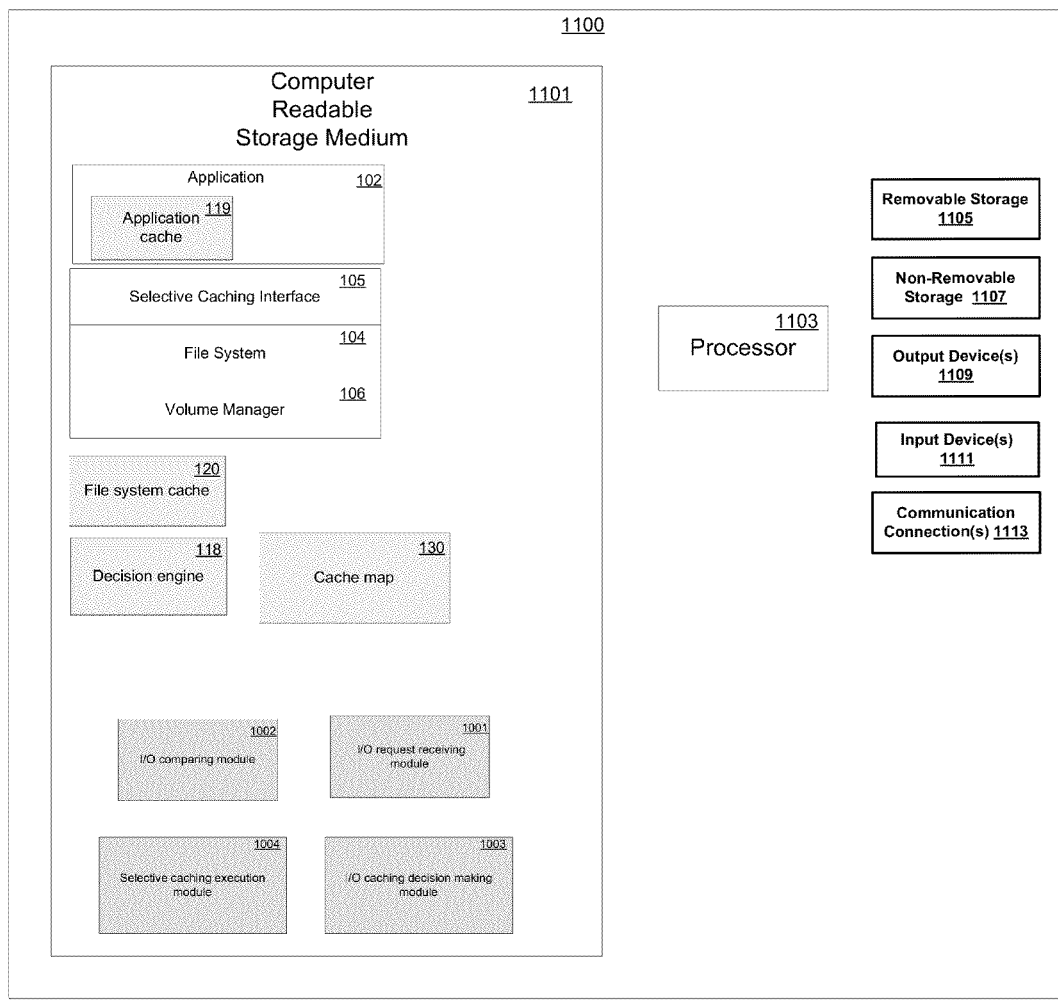
FIG. 11 shows an exemplary computer system according to one embodiment.

FIG. 11 shows an exemplary computer system 1100 according to one embodiment. Computer system 1100 depicts the components of a basic computer system providing the execution environment for certain hardware-based and software-based functionality for the above described embodiments. For example, computer system 1100 can be a system upon which the one or more software stacks and software modules are instantiated. Computer system 1100 can be implemented as, for example, a server computer system, workstation computer system, desktop computer system, or laptop computer system. Similarly, computer system 1100 can be implemented as a handheld device. Computer system 1100 typically includes at least some form of computer readable media (e.g., computer readable storage medium 1101). Computer readable media can be a number of different types of available media that can be accessed by computer system 1100 and can include, but is not limited to, computer storage media.

In its most basic configuration, computer system 1100 typically includes processing unit 1103 and memory 1101. Depending on the exact configuration and type of computer system 1100 that is used, memory 1101 can be volatile (e.g., such as DRAM, etc.) 1101*a*, non-volatile 1101*b* (e.g., such as ROM, flash memory, etc.) or some combination of the two. Similarly, the memory 1101 can comprise other devices besides solid-state devices, such as, for example, magnetic disk-based media, optical media, or the like.

Additionally, computer system 1100 can include other mass storage systems (e.g., removable 1105 and/or non-removable 1107) such as magnetic or optical disks or tape. Similarly, computer system 1100 can include input devices 1109 and/or output devices 1111 (e.g., such as a display). Computer system 1100 can further include network connections 1113 to other devices, computers, networks, servers, etc. using either wired or wireless media. As all of these devices are well known in the art, they need not be discussed in detail.

It should further be noted, that the computer system 1100 can have some, most, or all of its functionality supplanted by a distributed computer system having a large number of dispersed computing nodes, such as would be the case where the functionality of the computer system 1100 is partly or wholly executed using a cloud computing environment.

It should be noted that the term "volume" as used herein may refer to any defined amount of storage on one or more storage devices. In addition to its size and the storage device or device on which it is allocated, a volume may, in some cases, have other attributes (e.g. protection/performance features such as mirroring, striping, RAID level, spanning or concatenation etc.). The term volume may include, for example, logical volume as used in Unix-type operating systems such as Linux, AIX from IBM Corp., Solaris from Sun Microsystems, etc. The term volume may also include, for example, a volume as defined by various volume manager software such as VERITAS Volume Manager™ from VERITAS Software Corporation. The term volume may further include a partition as used, e.g., in the Microsoft Windows™ and/or disk operating system (DOS) operating systems. A partition may be a division of storage on a single disk drive, isolating the partitioned storage from other storage on the disk drive. Partitions may be primary or extended. The term volume may further refer to volume groups.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A computer implemented method comprising:
   receiving I/O requests from an application, each I/O request including metadata previously generated by the application that specifies an I/O type and a file type of the I/O request;
   comparing the metadata of each of the I/O requests received from the application with a configurable cache map, wherein the configurable cache map controls a selective caching based on the I/O type and the file type included in the metadata of the received I/O request, wherein the configurable cache map includes a plurality of file type and I/O type pairs and a corresponding caching decision for each of the plurality of pairs, and wherein the configurable cache map indicates that a first of the plurality of file type and I/O type pairs is to be cached, a second of the plurality of file type and I/O type pairs is to be not cached, and a third of the plurality of file type and I/O type pairs is to be cached and read ahead, wherein the metadata indicates how the application is to process data corresponding to the I/O request, and wherein the second of the plurality of file type and I/O type pairs corresponds to data that is being cached by the application in a separate application cache;

processing each of the I/O requests to render a cache or no-cache decision for each of the I/O requests based on the comparison of each I/O request to the configurable cache map; and executing selective caching on each of the I/O requests in accordance with the cache or no-cache decisions, wherein a first one of the I/O requests is cached in a file system cache when the cache decision is rendered for the first one of the I/O requests, wherein a second one of the I/O requests is not cached in the file system cache by bypassing the file system cache when the no-cache decision is rendered for the second one of the I/O requests, and wherein the first one of the I/O requests is cached and the second of the I/O requests is not cached without modification to the configurable cache map.

2. The computer implemented method of claim 1, wherein the application implements application directed caching of application I/O requests into an application cache separate from the file system cache.

3. The computer implemented method of claim 1, wherein the metadata provides a no-cache indication to a file system to implement a direct I/O, causing the file system to not cache the direct I/O based on the comparison of each I/O request to the configurable cache map.

4. The computer implemented method of claim 1, wherein the application is a database application.

5. The computer implemented method of claim 1, wherein the application interfaces with a file system via an ODM compliant interface module.

6. The computer implemented method of claim 1, wherein the configurable cache map is user defined via at least one of a command line interface of a file system and a GUI interface of the file system, and wherein the first one of the I/O requests is cached and the second of the I/O requests is not cached automatically without user modification to the configurable cache map.

7. The computer implemented method of claim 1, further comprising:
performing a work-load run, wherein caching is selectively performed during the work-load run; and
calculating statistics for the work-load run,
wherein the selective caching is executed in accordance with the calculated statistics, and wherein the selective caching is temporarily disabled on a per file basis in accordance with a comparison of the calculating statistics and a predetermined threshold.

8. The computer implemented method of claim 1, wherein at least one caching decision causes a file system to implement read ahead caching into the file system cache.

9. The computer implemented method of claim 8, wherein the read ahead caching is implemented in accordance with the caching decisions and the configurable cache map.

10. A non-transitory computer readable storage medium having stored thereon computer executable instructions that, if executed by a computer system, cause the computer system to perform a method comprising:
receiving I/O requests from a database application, each I/O request including metadata previously generated by the database application that specifies an I/O type and a file type of the I/O request;
comparing the metadata of each of the I/O requests received from the database application with a configurable cache map, wherein the configurable cache map controls a selective caching based the I/O type and the file type included in the metadata of the received I/O requests, wherein the configurable cache map includes a plurality of file type and I/O type pairs and a corresponding caching decision for each of the plurality of pairs, and wherein the configurable cache map indicates that a first of the plurality of file type and I/O type pairs is to be cached, a second of the plurality of file type and I/O type pairs is to be not cached, and a third of the plurality of file type and I/O type pairs is to be cached and read ahead, wherein the metadata indicates how the application is to process data corresponding to the I/O request, and wherein the second of the plurality of file type and I/O type pairs corresponds to data that is being cached by the application in a separate application cache;

processing each of the I/O requests to render a cache or no-cache decision for each of the I/O requests based on the comparison of each I/O request to the configurable cache map; and executing selective caching on each of the I/O requests in accordance with the cache or no-cache decisions, wherein a first one of the I/O requests is cached in a file system cache when the cache decision is rendered for the first one of the I/O requests, wherein a second one of the I/O requests is not cached in the file system cache by bypassing the file system cache when the no-cache decision is rendered for the second one of the I/O requests, and wherein the first one of the I/O requests is cached and the second of the I/O requests is not cached without modification to the configurable cache map.

11. The computer readable storage medium of claim 10, wherein the database application implements application directed caching of application I/O requests into an application cache separate from the file system cache.

12. The computer readable storage medium of claim 10, wherein the database metadata provides a no-cache indication to a file system to implement a direct I/O, causing the file system to not cache the direct I/O based on the comparison of each I/O request to the configurable cache map.

13. The computer readable storage medium of claim 10, wherein the database application interfaces with a file system via an ODM compliant interface module.

14. The computer readable storage medium of claim 10, wherein at least one caching decision causes a file system to implement read ahead caching into the file system cache, the read ahead caching implemented in accordance with the caching decisions and the configurable cache map.

15. A computer system, comprising:
a computer having a processor coupled to a computer readable storage media and executing computer readable code which causes the computer to:
receive I/O requests from a database application, each I/O request including metadata previously generated by the database application that specifies an I/O type and a file type of the I/O request;
compare the metadata of each of the I/O requests received from the database application with a configurable cache map, wherein the configurable cache map controls a selective caching based on the I/O type and the file type included in the metadata of the received I/O requests, wherein the configurable cache map includes a plurality of file type and I/O type pairs and a corresponding caching decision for each of the plurality of pairs, and wherein the configurable cache map indicates that a first of the plurality of file type and I/O type pairs is to be cached, a second of the plurality of file type and I/O type pairs is to be not cached, and a third of the plurality of file type and I/O type pairs is to be cached and read ahead, wherein the metadata indicates how the application is to process data corresponding to the I/O request, and wherein the second of the plurality of file type and I/O type pairs corresponds to data that is being cached by the application in a separate application cache;

process each of the I/O requests to render a cache or no-cache decision for each of the I/O requests based on the comparison of each I/O request to the configurable cache map; and execute selective caching on each of the I/O requests in accordance with the cache or no-cache decisions, wherein a first one of the I/O requests is cached in a file system cache when the cache decision is rendered for the first one of the I/O requests, wherein a second one of the I/O requests is not cached in the file system cache by bypassing the file system cache when the no-cache decision is rendered for the second one of the I/O requests, and wherein the first one of the I/O requests is cached and the second of the I/O requests is not cached without modification to the configurable cache map.

16. The computer system of claim 15, wherein the database application implements application directed caching of application I/O requests into an application cache separate from the file system cache.

17. The computer system of claim 15, wherein the metadata provides a no-cache indication to a file system to implement a direct I/O, causing the file system to not cache the direct I/O based on the comparison of each I/O request to the configurable cache map.

18. The computer system of claim 15, wherein at least one caching decision causes a file system to implement read ahead caching into the file system cache, the read ahead caching implemented in accordance with the caching decisions and the configurable cache map.

19. The computer system of claim 15, wherein the configurable cache map is user configurable via a command line interface of a file system.

* * * * *